United States Patent
Liu et al.

(10) Patent No.: US 11,413,609 B2
(45) Date of Patent: Aug. 16, 2022

(54) PHOTOCATALYTIC OIL-WATER SEPARATION MATERIAL AND PREPARATION METHOD THEREOF

(71) Applicants: Southwest Petroleum University, Chengdu (CN); Hai tian Water Group Co., Ltd, Chengdu (CN)

(72) Inventors: Yucheng Liu, Chengdu (CN); Meng Zhu, Chengdu (CN); Mingyan Chen, Chengdu (CN); Zhicheng Pan, Chengdu (CN); Maoren Wang, Chengdu (CN); Lian Qiu, Chengdu (CN); Maoqi Liao, Chengdu (CN); Bing Yang, Chengdu (CN); Dong Gan, Chengdu (CN)

(73) Assignees: Southwest Petroleum University, Chengdu (CN); Hai tian Water Group Co., Ltd, Chengdu (CN)

( * ) Notice: Subject to any disclaimer, the term of this patent is extended or adjusted under 35 U.S.C. 154(b) by 0 days.

(21) Appl. No.: 17/551,158

(22) Filed: Dec. 14, 2021

(65) Prior Publication Data
US 2022/0184590 A1    Jun. 16, 2022

(30) Foreign Application Priority Data

Dec. 15, 2020 (CN) .......................... 202011476717.5

(51) Int. Cl.
| C02F 1/40 | (2006.01) |
| B01J 31/16 | (2006.01) |
| B01J 37/04 | (2006.01) |
| B01J 37/10 | (2006.01) |
| B01J 37/06 | (2006.01) |
| B01J 37/34 | (2006.01) |
| B01D 17/04 | (2006.01) |
| C02F 1/32 | (2006.01) |
| C02F 1/72 | (2006.01) |
| B01J 35/00 | (2006.01) |
| C02F 101/32 | (2006.01) |

(52) U.S. Cl.
CPC ........ *B01J 31/1691* (2013.01); *B01D 17/047* (2013.01); *B01J 35/004* (2013.01); *B01J 37/04* (2013.01); *B01J 37/06* (2013.01); *B01J 37/10* (2013.01); *B01J 37/343* (2013.01); *C02F 1/32* (2013.01); *C02F 1/40* (2013.01); *C02F 1/725* (2013.01); *B01J 2531/16* (2013.01); *B01J 2531/46* (2013.01); *B01J 2531/842* (2013.01); *C02F 2101/32* (2013.01); *C02F 2305/10* (2013.01)

(58) Field of Classification Search
None
See application file for complete search history.

(56) References Cited

FOREIGN PATENT DOCUMENTS

| CN | 108671774 B | * | 10/2018 |
| CN | 108889132 A |   | 11/2018 |
| CN | 108905295 A | * | 11/2018 |
| CN | 111019148 A |   | 4/2020 |

OTHER PUBLICATIONS

Machine-generated English translation for CN 108905295 A (Year: 2018).*
Yang, Long et al., "Effect of Metal Exchange on the Light-Absorbing and Band-Gap Properties of Nanoporous Zn—Cu based MOFs", Chinese Journal of Inorganic Chemistry, Jul. 2018, vol. 34, No. 7, pp. 1199-1208, DOI: 10.11862/CJIC.2018.117.

* cited by examiner

*Primary Examiner* — Yun Qian (57) ABSTRACT

The invention relates to a photocatalytic oil-water separation material and a preparation method thereof, the method including the following steps: cleaning a base material and a metal-doped material, and drying for later use; preparing a mixed solution of an amine monomer and an acid-alkali buffer reagent, soaking the base material in the mixed solution, and reacting under an oscillation condition, to obtain the base material attached with amine monomer polymer; dissolving a soluble metal additive and an organic ligand reagent into an organic solvent, and performing ultrasonic stirring uniformly, to obtain a metal organic framework material (MOF) reaction solution with photocatalytic performance; and placing the metal-doped material, the base material attached with the amine and the MOF reaction solution into a reaction kettle for performing hydrothermal reaction, cleaning and drying the reacted base material, to obtain the photocatalytic oil-water separation material.

6 Claims, 8 Drawing Sheets

PHOTOCATALYTIC OIL-WATER SEPARATION MATERIAL AND PREPARATION METHOD THEREOF

CROSS-REFERENCE TO RELATED APPLICATION

This application claims priority to Chinese Patent Application No. 202011476717.5 entitled "PHOTOCATALYTIC OIL-WATER SEPARATION MATERIAL AND PREPARATION METHOD THEREOF" and filed on Dec. 15, 2020, the content of which is hereby incorporated by reference in its entirety.

BACKGROUND

Technical Field

The present disclosure generally relates to a technical field of oil-water separation technologies, and especially relates to a photocatalytic oil-water separation material and a preparation method thereof.

Description of Related Art

A large amount of oily wastewater caused by crude oil exploitation, offshore oil leakage accidents and domestic sewage is still a major problem that perplexes environments at present. A common treatment method of oily wastewater has problems of low separation efficiency, high energy consumption, a high reagent cost and waste of oil resources, which needs to be solved urgently. With the development of material science, a material with special wettability obtains certain achievements in the field of oil-water separation. By designing the special wettability of surfaces of the material, two types of oil-water separation materials that are "a water removal type" with super-hydrophilic/superoleophobic and "an oil removal type" with super-hydrophobicity/superoleophilicity are obtained. An oleophilic material is easily polluted by oil in an oil-water separation process, and a cleaning process thereof is also easy to cause secondary pollution, while, a hydrophilic material can avoid the problem that the material is polluted by oil. In addition, considering the harm of dye wastewater to the photosynthesis of aquatic organisms, life and human health, not only both designing the oil-water separation material and the treatment of organic dyes in wastewater should be considered, but also the oil-water separation material should have two functions of separation and purification, which can improve a treatment effect of wastewater to a certain extent.

CN patent application CN11086218A discloses an oil-water separation microporous membrane with a photocatalytic function, but the treatment of oil droplets with large particle sizes is easy to cause pore blockages, and a special wettability does not reach a super-hydrophobicity state. CN patent application CN201711109397.8 discloses a super-hydrophobic mesh with a self-cleaning function that can degrade dyes under ultraviolet light. CN patent application CN106362439A discloses a super-hydrophilic/underwater superoleophobic oil-water separation metal mesh prepared by a laser surface modification technology, with oil-water separation performance. CN patent application CN108404683A discloses an MOFs modified metal mesh composite membrane with a micro-nano structure, which has high-efficiency oil-water separation performance. A document (Desalination, 2019, 491:114558) reports that a photocatalytic PVDF composite membrane is prepared by using AgCO3 doped MOFs materials, and can achieve the separation of oil-water emulsion and the degradation of pollutants. An article (CHEM ENG J, 2017, 307:803-811) reports that an anodic oxidation method is used to prepare a cauliflower-shaped $CuWO_4@Cu_2O$ composite membrane with superhydrophilicity/underwater superolephobicity on a copper mesh, so that high-efficiency oil-water mixtures can be separated, and organic pollutants in water can be degraded by photocatalysis. A document (NAT COMMON, 2012, 3:1025) discloses a material that is capable of simultaneously implementing oil-water separation and photodegradation of wastewater is prepared by using a photocatalytic material $TiO_2$. A document (ADV MATER, 2013, 25:4192-4198) also discloses that a photocatalytic material $TiO_2$ is used to prepare a cotton fabric oil-water separation material with photocatalytic and oil-water separation performance under modification of polybenzoxazine. Although the special wettability materials with separation and purification performance are successfully prepared, the following problems still need to be solved:

(1) The oil-water separation composite membrane material has poor stability, easy to be blocked due to small pore channels, in addition, a PVDF polymer membrane has poor stability under extreme environments such as strong acid and strong alkali, so that the membrane is easy to be corroded and has poor long-time working performance;

(2) the preparation method is complex, high energy consumption is occurred in the laser surface modification technology that is difficult to be operated, although the modification with toxic reagents such as fluorine can improve the oil-water separation performance, it has poor environmental protection and poor reusability; and (3) because intrinsic photocatalytic materials such as the MOFs and the $TiO_2$ are used, a forbidden band width of a raw material is larger, so that the utilization of solar energy is limited, and the photocatalysis efficiency is low.

SUMMARY

The technical problems to be solved: in view of the shortcomings of the related art, the present disclosure relates to a photocatalytic oil-water separation material and a preparation method thereof, which have superhydrophilicity/underwater superoleophobicity, and simultaneously adopt for MOFs with a bimetallic center structure, thereby reducing a forbidden bandwidth of the MOFs and increasing a light utilization rate of the MOFs.

The present disclosure adopts the following technical scheme that a preparation method of a photocatalytic oil-water separation material includes the following steps:

step S1, sequentially cleaning a base material and a metal-doped material by using an alcohol solvent, a dilute acid solution and deionized water, and drying for later use;

step S2, preparing a mixed solution of an amine monomer and an acid-alkali buffer reagent, soaking the base material in the mixed solution, and reacting under an oscillation condition, to obtain the base material attached with amine monomer polymer;

step S3, dissolving a soluble metal additive and an organic ligand reagent including carboxylic acid or pyridine into an organic solvent, and uniformly performing ultrasonic stirring to obtain a photocatalytic MOFs reaction solution;

step S4, placing the metal-doped material in the step S1, the base material that has been reacted in the step S2 and the MOFs reaction solution obtained in the step S3 into a reaction kettle for performing hydrothermal reaction; and step S5, cleaning the base material that has been reacted in the step S4 by using anhydrous methanol or anhydrous ethanol, and then drying to obtain the photocatalytic oil-water separation material.

Wherein the base material in the step S1 is one of a stainless steel wire mesh, an iron mesh, a copper mesh, a titanium mesh, a nickel mesh, a foam iron, a foam copper and cotton cloth; the metal-doped material is one of the copper mesh, the iron mesh, the titanium mesh, the nickel mesh, a foam nickel, the foam copper and the foam iron; the soluble metal additive in the step S3 is one of zirconium chloride, ferric chloride, chromium nitrate, bismuth nitrate, and titanic acid. Meanwhile, in order to ensure a good effect of oil-water separation, a pore diameter of the base material is 200-600 meshes.

Wherein metal types included in the soluble metal additive and the base material are different from that of the metal-doped material.

Wherein the alcoholic solvent in the step S1 is one of the anhydrous methanol and the anhydrous ethanol, with a mass fraction of 95%-99.9%; the diluted acid solution is one of diluted hydrochloric acid, diluted sulfuric acid and diluted nitric acid, with a concentration of 0.25-1.0 M.

Wherein the amine monomer in the step S2 is one or two of dopamine hydrochloride and catecholamine, with a concentration of 0.5-2.5 mg/mL; the acid-alkali buffer reagent is one of a tris (hydroxymethyl) aminomethane hydrochloride reagent and a sodium dihydrogen phosphate-citric acid buffer reagent, with a concentration of 0.05-0.2 mg/L; and a pH value of the mixed solution is 8-9.

Wherein a specific operation of the step S2 is as follows: preparing an amine monomer solution, and then adjusting a pH value to 8.5 by using a buffer solution and a sodium hydroxide solution, adding the base material obtained in the step S1 within 10 seconds, and reacting for 12-24 hours at a constant temperature under conditions that a temperature is 20-80° C. and a stirring speed is 60-180 r/min, to obtain the base material attached with the amine monomer polymer.

Wherein in the step S3, a concentration of the soluble metal additive in the MOFs reaction solution is 10-30 mM; the organic ligand reagent including carboxylic acid or pyridine is one of 2-aminoterephthalic acid, 2,5-dihydroxyterephthalic acid, terephthalic acid, trimesic acid and 2-mercaptonicotinic acid, with a concentration of 10-30 mM; the organic solvent is one of N,N-dimethylformamide, N,N-dimethylacetamide, the anhydrous ethanol and the anhydrous methanol.

Wherein in the step S4, a quantity ratio of the base material to the metal-doped material is 2:1-10:1, and both the base material and the metal-doped material are soaked in the MOFs reaction solution; a time of the hydrothermal reaction is 6-24 hours, and a reaction temperature of the hydrothermal reaction is 100-180° C.

A photocatalytic oil-water separation material of the present disclosure is prepared by the above preparation method, and the photocatalytic MOFs is a bimetal central structure.

The present disclosure provides advantages as below:

(1) The oil-water separation material of the present disclosure is provided to integrate separation and purification performance of organic wastewater treatment, which can not only realize high-efficiency oil-water separation, but also realize high-efficiency photocatalytic degradation of organic wastewater.

(2) The oil-water separation material of the present disclosure is provided to have superhydrophilicity and underwater superoleophobicity, a water contact angle in the air of the material is close to 0°, the contact angle of oil underwater is greater than 150°, and the separation performance of a water mixture of heavy-oil or light-oil, and high-salt-content oily wastewater is more than 98.5%.

(3) The oil-water separation material of the present disclosure is provided to have strong mechanical stability and antifouling performance, maintain underwater superoleophobicity in strong acid, strong alkali, high salt and organic solvent, and is suitable for oily wastewater treatment in complex environments, with a high efficiency of photocatalytic degradation organic dyes, and a removal rate is as high as 99%.

(4) According to the present disclosure, the MOFs is modified by using the metal-doped material, metal ions are released in the organic solvent through the metal-doped material to compete and replace with metal central ions of an original MOFs, to form the MOFs with a bimetal center, which can reduce the forbidden bandwidth of the MOFs, enhance the utilization rate of ultraviolet and visible light, and effectively improve the photocatalytic performance of the material.

(5) The metal-doped material can be recycled after being cleaned, so that the preparation cost can be reduced to a certain extent, and a maximization of resource utilization is achieved.

(6) By using the method of the present disclosure, the base material can be selected from a plurality of metal meshes, foam metals or even cotton cloth, to greatly widen a selection range thereof, so that a selection range of the material can be increased, and an application range can be wider.

(7) An one-step hydrothermal synthesis method of the present disclosure is provided to have advantages of easy operation, complete reaction and environment-friendly in reagents, a surface structure of the oil-water separation material is more stable and firm by a dopamine surface modification method thereof, so that reusability and higher stability can be obtained, and a good industrial application prospect of the method can be occurred.

DETAILED DESCRIPTION

In order to more clearly understand and implement the technical features, objects, and advantages of the present disclosure for one of ordinary skilled in the related art, the principles and characteristics of the present disclosure are described on the basis of these drawings and embodiments; the examples cited are provided only to interpret the present disclosure, but not to limit the scope of the present disclosure.

Chemical raw materials used in the present disclosure are chemically pure unless otherwise specified.

A First Embodiment

Step S1, material pretreatment: cutting a stainless steel wire mesh taken as a base material and a copper mesh taken as a metal-doped material into circles with a diameter of 4 cm, soaking the circles in anhydrous ethanol, hydrochloric acid and pure water, ultrasonically cleaning the circles for 30 minutes to remove surface oxides and grease, and drying the circles for later use. A pore size of the base material is 400 meshes.

Step S2, Further treatment of the base material: preparing a tris (hydroxymethyl) aminomethane hydrochloride buffer solution with a concentration of 0.1 mg/L, a dopamine hydrochloride solution with a concentration of 2 mg/L, and a sodium hydroxide solution with a concentration of 0.5 M, adjusting a pH value of the dopamine hydrochloride solution by using the buffer solution and the sodium hydroxide solution, to obtain a mixed solution with the pH value of 8.5, soaking the stainless steel wire mesh obtained in the step S1 in the mixed solution, oscillating and reacting for 24 hours in a constant-temperature gas bath at a temperature of 60° C., cleaning the stainless steel wire mesh after the above reaction until the water is clear, and drying at the temperature of 60° C. for later use.

Step S3, preparation of MOFs reaction solution: adding zirconium chloride and 2-aminoterephthalic acid into an N,N-dimethylformamide solvent, respectively, performing ultrasonic full dissolution, and uniformly mixing the two solutions to obtain the MOFs reaction solution, wherein a concentration of the zirconium chloride is 25 mM, and a concentration of the 2-aminoterephthalic acid is 30 mM.

Step S4, preparation of the oil-water separation material: placing the copper mesh in the step S1 and the stainless steel wire mesh in the step S2 into a polytetrafluoroethylene reaction kettle, adding 50 ml MOFs reaction solution in the step S3, and reacting at 180° C. for 12 hours.

Step S5, cleaning the stainless steel wire mesh obtained in the step S4 by using the anhydrous ethanol for 3-5 times, and drying at 60° C. to obtain the photocatalytic oil-water separation material of the present disclosure.

In the first embodiment of the present disclosure, the copper mesh taken as the metal-doped material can be reused after being cleaned by the anhydrous ethanol, a diluted acid solution and pure water, so as to reduce the waste of resources, and the production cost.

A Second Embodiment

A preparation method of the photocatalytic oil-water separation material of the embodiment is as follows:

step S1, material pretreatment: cutting a base material and a metal-doped material into circles with a diameter of 4 cm, ultrasonically cleaning the base material and the metal-doped material in the anhydrous ethanol, hydrochloric acid and pure water for 30 minutes, to remove surface oxides and grease, and drying the base material and the metal-doped material in a vacuum drying oven for later use; the base material is cotton cloth, and the metal-doped material is a copper mesh; preparing tris (hydroxymethyl) aminomethane hydrochloride into a buffer solution with a concentration of 0.1 mg/L, and sodium hydroxide into a solution with a concentration of 0.5 M.

step S2, adjusting a pH value of a dopamine hydrochloride solution (2.0 mg/mL) to 8.5 by using the buffer solution and the sodium hydroxide solution obtained in the step S1, placing the cotton cloth obtained in the step S1 therein, oscillating and reacting for 24 hours in a constant-temperature gas bath at a temperature of 60° C., cleaning the cotton cloth after the reaction until the water is clear, and drying at the temperature of 60° C. for later use.

step S3, preparation of the MOFs reaction solution: adding zirconium chloride and 2-aminoterephthalic acid into an N,N-dimethylformamide solvent, respectively, performing ultrasonic dissolution, and uniformly mixing and stirring the two solutions for 30 minutes; wherein a concentration of the zirconium chloride is 10 mM, and a concentration of the 2-aminoterephthalic acid is 15 mM.

step S4, placing the cotton cloth in the step S2 and the copper mesh in the step S1 into a polytetrafluoroethylene reaction kettle, adding 40 mL MOFs reaction solution obtained in the step S3, and performing hydrothermal reaction at a temperature of 120° C. for 12 hours.

step S5, cleaning the base material obtained in the step S4 by using the anhydrous methanol for 3-5 times, and drying at 60° C. to obtain the photocatalytic oil-water separation material of the present disclosure.

In the second embodiment of the present disclosure, the copper mesh taken as the metal-doped material can be reused after being cleaned by the anhydrous ethanol, a diluted acid solution and pure water, so as to reduce the waste of resources, and the production cost.

A Third Embodiment

A preparation method of the photocatalytic oil-water separation material of the embodiment is as follows:

step S1, material pretreatment and preparation of acid-alkali buffer solution: cutting an iron mesh and a foam copper into squares of 4×4 cm, and ultrasonically cleaning the squares in anhydrous ethanol, diluted sulfuric acid and pure water for 30 minutes for later use; preparing a tris (hydroxymethyl) aminomethane hydrochloride buffer solution with a concentration of 0.1 mg/L, and a sodium hydroxide solution (0.5 M).

step S2, placing the iron mesh obtained in the step S1 in a dopamine hydrochloride solution with a concentration of 1 mg/L, adjusting a pH value of the dopamine hydrochloride solution to 8.5 by using the buffer solution and the sodium hydroxide solution prepared in the step S1, oscillating and reacting for 24 hours at 60° C., cleaning with pure water, and drying at 60° C. for later use.

step S3, preparation of the MOFs reaction solution: adding ferric trichloride and terephthalic acid into a mixed solution of DMF and anhydrous methanol, respectively, performing ultrasonic dissolution, and uniformly mixing and stirring for 30 minutes; wherein a concentration of the ferric trichloride is 20 mM, and a concentration of the terephthalic acid is 25 mM.

step S4, placing the iron mesh in the step S2 and the foam copper in the step S1 into a polytetrafluoroethylene reaction kettle, adding 40 mL MOFs reaction solution obtained in the step S3, and performing hydrothermal reaction at the temperature of 120° C. for 8 hours.

step S5, cleaning the iron mesh obtained in the step S4 with the anhydrous methanol for 3-5 times, and drying at 60° C. to obtain the photocatalytic oil-water separation material of the present disclosure.

In the third embodiment of the present disclosure, the foam copper taken as the metal-doped material can be reused after being cleaned by the anhydrous ethanol, a diluted acid solution and pure water, so as to reduce the waste of resources, and the production cost.

A Fourth Embodiment

A preparation method of the photocatalytic oil-water separation material of the embodiment is as follows:

step S1, material pretreatment and preparation of acid-alkali buffer solution: cutting a titanium mesh and a copper mesh into squares of 4×4 cm, and ultrasonically cleaning the squares in anhydrous ethanol, diluted hydrochloric acid and pure water for 30 minutes for later use; preparing a sodium dihydrogen phosphate-citric acid buffer reagent with a concentration of 0.1 mg/L and a sodium hydroxide solution with a concentration of 0.5M.

step S2, preparing a dopamine hydrochloride solution with a concentration of 2 mg/mL, adjusting a pH value to 8.5 by using the buffer reagent and the sodium hydroxide solution obtained in the step S1, placing the titanium mesh obtained in the step S1 in the mixed solution with the pH value of 8.5, oscillating and reacting for 20 hours at 60° C., cleaning with pure water, and drying at 60° C. for later use.

step S3, preparation of the MOFs reaction solution: adding titanic acid and 2,5-dihydroxy terephthalic acid into a mixed solution of DMF and anhydrous methanol, respectively, uniformly mixing by ultrasonic waves and stirring for 30 minutes, wherein a concentration of the titanic acid is 20 mM, and a concentration of the 2,5-dihydroxy terephthalic acid is 25 mM.

step S4, placing the titanium mesh in the step S2 and the copper mesh in the step S1 into a polytetrafluoroethylene reaction kettle, adding 40 mL MOFs reaction solution obtained in the step S3, and performing hydrothermal reaction at the temperature of 120° C. for 8 hours.

step S5, cleaning the titanium mesh obtained in the step S4 with the anhydrous methanol for 3-5 times, and drying at 60° C. to obtain the photocatalytic oil-water separation material of the present disclosure.

In the fourth embodiment of the present disclosure, the copper mesh taken as the metal-doped material can be reused after being cleaned by the anhydrous ethanol, a diluted acid solution and pure water, so as to reduce the waste of resources, and the production cost.

A Fifth Embodiment

A preparation method of the photocatalytic oil-water separation material of the embodiment is as follows:

step S1, material pretreatment and preparation of buffer solution: cutting a stainless steel wire mesh and a titanium mesh into squares of 4×4 cm, and ultrasonically cleaning the squares in anhydrous ethanol, diluted hydrochloric acid and pure water for 30 minutes, and drying the stainless steel wire mesh and the titanium mesh for later use; preparing a sodium dihydrogen phosphate-citric acid buffer reagent with a concentration of 0.1 mg/L and a sodium hydroxide solution with a concentration of 0.5 M.

step S2, adjusting a pH value of a dopamine hydrochloride solution to 8.5 by using the buffer reagent and the sodium hydroxide solution obtained in the step S1, soaking the stainless steel wire mesh obtained in the step S1 therein, oscillating and reacting for 24 hours in a constant-temperature gas bath at a temperature of 30° C., cleaning and drying the stainless steel wire mesh, to obtain the polydopamine modified stainless steel wire mesh.

step S3, preparation of the MOFs reaction solution: respectively adding bismuth nitrate pentahydrate and trimesic acid into 20 mL mixed solvent of DMF and anhydrous ethanol, performing ultrasonic dissolution, mixing the two solutions, and stirring for 30 minutes, wherein a concentration of the bismuth nitrate pentahydrate is 20 mM, and a concentration of the trimesic acid is 25 mM.

step S4, placing the stainless steel wire mesh in the step S2 and the titanium mesh in the step S1 into a polytetrafluoroethylene reaction kettle, adding 50 mL MOFs reaction solution obtained in the step S3, and performing hydrothermal reaction at a temperature of 120° C. for 12 hours.

step S5, cleaning the stainless steel wire mesh obtained in the step S4 with the anhydrous methanol for 3-5 times, and drying at 60° C. to obtain the photocatalytic oil-water separation material of the present disclosure.

In the fifth embodiment of the present disclosure, the titanium mesh taken as the metal-doped material can be reused after being cleaned by the anhydrous ethanol, a diluted acid solution and pure water, so as to reduce the waste of resources, and the production cost.

A Sixth Embodiment

A preparation method of the photocatalytic oil-water separation material of the embodiment is as follows:

step S1, material pretreatment and preparation of acid-alkali buffer solution: cutting a foam iron and a titanium mesh into squares of 4×4 cm, and ultrasonically cleaning the squares in anhydrous ethanol, diluted hydrochloric acid and pure water for later use; preparing a tris (hydroxymethyl) aminomethane hydrochloride buffer solution with a concentration of 0.1 mg/L, and a sodium hydroxide solution with a concentration of 0.5 M.

step S2, adjusting a pH value of a dopamine hydrochloride solution to 8.5 by using the buffer solution and the sodium hydroxide solution obtained in the step S1 in advance, placing the foam iron taken as the base material in the step S1 in the dopamine hydrochloride solution with a concentration of 1 mg/mL, reacting at 60° C. for 20 hours, cleaning the foam iron with pure water, and drying at 60° C. for later use.

step S3, preparation of the MOFs reaction solution: adding ferric trichloride and terephthalic acid into a mixed solution of N,N-dimethylacetamide and anhydrous ethanol, respectively, performing ultrasonic accelerated dissolution, and mixing and stirring for 30 minutes; wherein a concentration of the ferric trichloride is 10 mM, and a concentration of the terephthalic acid is 15 mM.

step S4, placing the foam iron in the step S2 and the titanium mesh in the step S1 into a polytetrafluoroethylene reaction kettle, adding 40 mL MOFs reaction solution obtained in the step S3, performing hydrothermal reaction at a temperature of 120° C. for 12 hours; and cleaning the foam iron for a plurality of times after performing hydrothermal reaction by using anhydrous methanol, and drying at 60° C. to obtain the photocatalytic oil-water separation material of the present disclosure.

A difference between the sixth embodiment and the fifth embodiment is that: the concentration of the dopamine hydrochloride is adjusted to be 1 mg/mL, the base material and the metal-doped material are respectively changed to be the foam iron and the titanium copper, the MOFs is changed to be iron-MOFs from bismuth-MOFs, the concentrations of the MOFs preparation material are changed to be 10 mM and 15 mM, and the organic solvent is changed to be the mixed solution of the N,N-dimethylacetamide and the anhydrous ethanol.

In the sixth embodiment of the present disclosure, the titanium mesh taken as the metal-doped material can be reused after being cleaned by the anhydrous ethanol, a diluted acid solution and pure water, so as to reduce the waste of resources, and the production cost.

In order to further illustrate the technical effect of the present disclosure, the following performance tests are performed on the oil-water separation material of the first embodiment.

Figure 1:
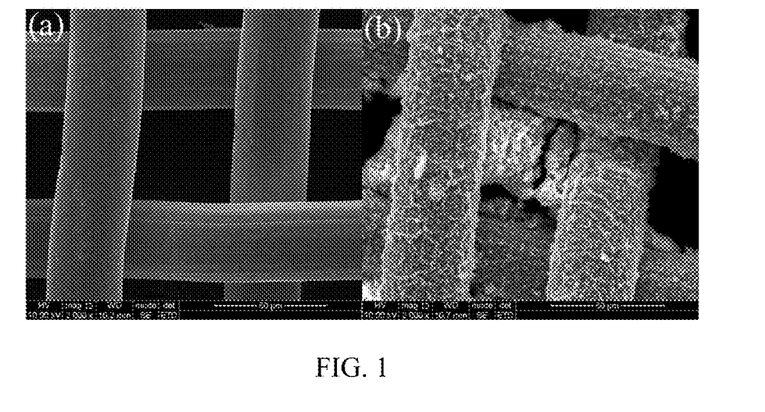
FIG. 1 is a scanning electron microscope (SEM) view of an original stainless steel wire mesh (a) and a stainless steel wire mesh (b) that has been modified of the present disclosure.

1. SEM test: FIG. 1 is the SEM view of the photocatalytic stainless steel wire mesh prepared in the first embodiment of the present disclosure, wherein FIG. a is shown an original stainless steel wire mesh and FIG. b is shown a stainless steel wire mesh that has been modified. As can be seen from FIG. 1, a surface of the original stainless steel wire mesh is smooth without a rough structure, after modification, the surface of the stainless steel wire mesh is uniformly coated with a layer of rough structure that is composed of zirconium-MOFs, and a particle size and a shape of particles are irregular, so that the stainless steel wire mesh is more hydrophilic.

Figure 2:
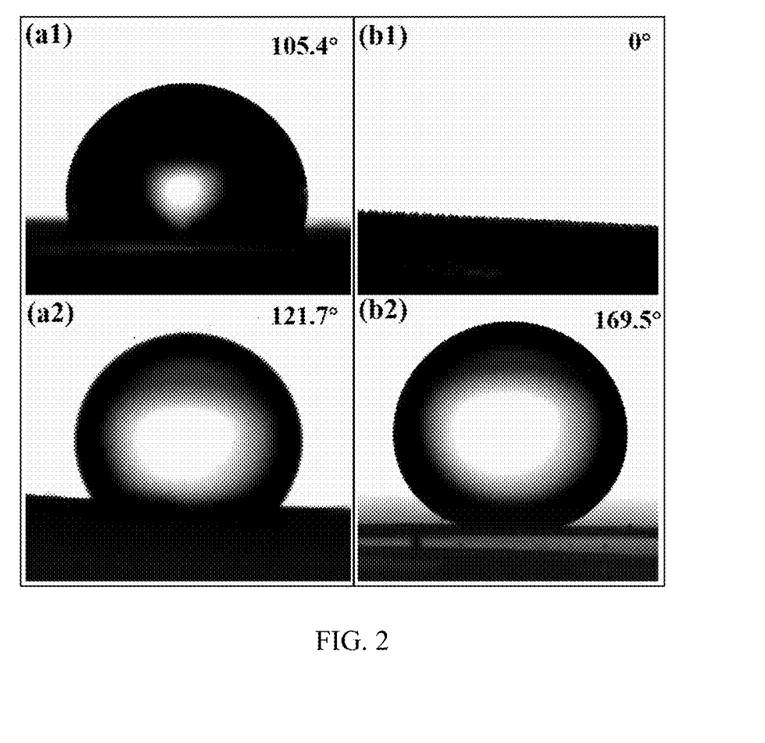
FIG. 2 is shown a water contact angle and an underwater oil contact angle of a base material, wherein a1 is the water contact angle of an original base material, and b1 is the water contact angle of an oil-water separation material in accordance with a first embodiment of the present disclosure; a2 is the underwater oil contact angle of the original base material, and b2 is the underwater oil contact angle of the oil-water separation material in accordance with the first embodiment of the present disclosure.

2. Contact angle test: FIG. 2 is a view showing a water contact angle and an underwater oil contact angle of the photocatalytic stainless steel wire mesh and the original stainless steel wire mesh obtained in the first embodiment of the present disclosure. Pure water and cyclohexane are respectively taken as a liquid phase, and a full-automatic contact angle tester is adopted to measure the contact angles of the stainless steel wire mesh with different liquid phases before and after modification. As can be seen from FIG. (a1) and FIG. (b1), that the contact angles of the original stainless steel wire mesh and the stainless steel wire mesh that has been modified to the pure water in the air are 105.4° and 0°, respectively, and the surface has been modified is a super-hydrophilic surface. It can be seen from FIG. (a2) and FIG. (b2), that the underwater oil contact angles of the original stainless steel wire mesh are 121.7° and 169.5°, respectively, which indicates that the stainless steel wire mesh that has been modified has underwater superoleophobic performance.

Figure 3:
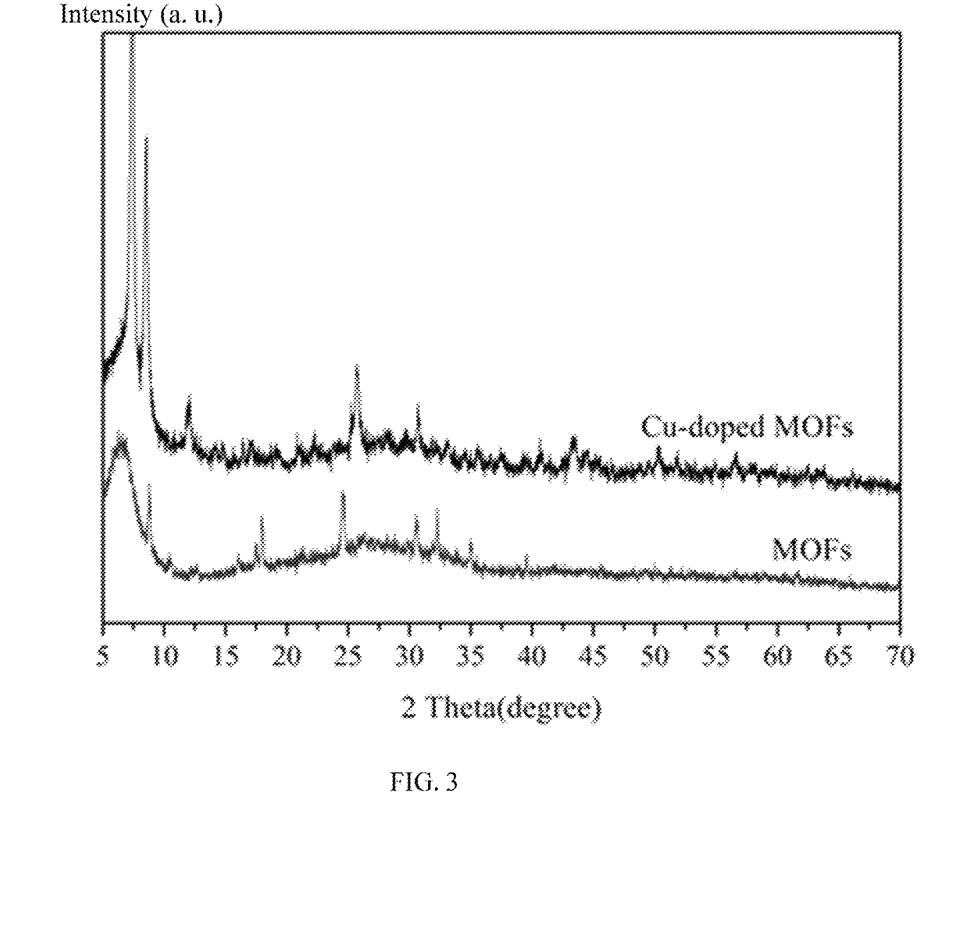
FIG. 3 is an XRD diagram of Cu doping/un-doping on the MOFs in accordance with the first embodiment of the present disclosure.

3. XRD diagram of MOFs with a bimetallic central structure: as can be seen from the XRD diagram of Cu-doped MOFs and un-doped modified MOFs, a diffraction peak of the Cu-doped MOFs with about 5-10° is obviously enhanced when comparing with that of the un-doped modified MOFs, $Cu^{2+}$ with a smaller particle size replaces $Zr^{4+}$ with a greater particle size to form the MOFs with a bimetallic center. The doping of $Cu^{2+}$ will cause crystal lattices of the MOFs to generate micro deformation, so that the crystal lattices of the MOFs contract to form structural defects, which represents the phenomenon that intensity of the diffraction peak is increased and an angle of the diffraction peak is changed, and further explains a successful doping of the MOFs material by copper ions.

Figure 4:
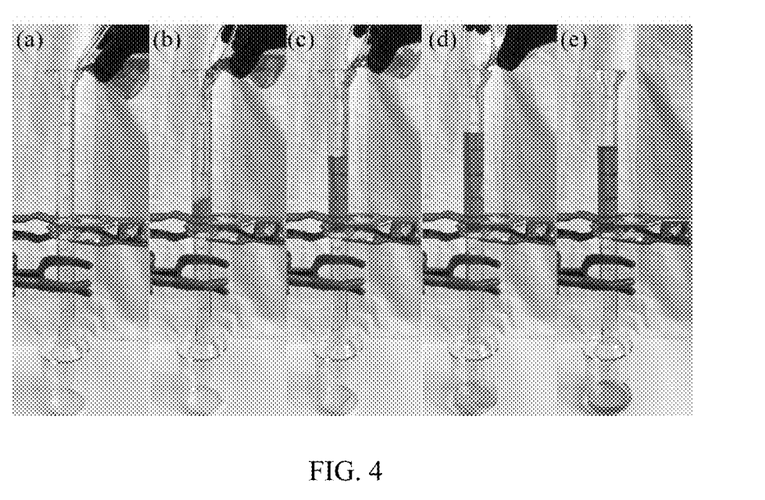
FIG. 4 is a diagram of a separation process of a cyclohexane/water mixture from the oil-water separation material in accordance with the first embodiment of the present disclosure.

4. Oil-water separation test: as shown in FIG. 4, a water phase and an oil phase are mixed according to a volume ratio of 1:1, the water phase is dyed with methylene blue and the oil phase is dyed with Sudan II, so that the oil-water separation process can be observed conveniently. It can be seen from FIG. 4 that water can quickly pass through the super-hydrophilic stainless steel wire mesh, while the oil phase is intercepted without passing through the metal mesh, so that superhydrophilicity of the stainless steel wire mesh that has been modified is reflected.

5. Separation and test of different kinds of heavy oil, light oil and high-salt-content oily wastewater: it can be seen from FIG. (a) of FIG. 5 that the photocatalytic stainless steel wire mesh obtained in the first embodiment of the present disclosure has a separation efficiency of more than 98.5% for an oil-water mixture of petroleum ether, dichloromethane, cyclohexane, toluene and n-octane, and has good separation performance for the oil-water mixture of heavy oil and light oil. It can be seen from FIG. (b) of FIG. 5 that the underwater oil contact angle is still maintained above 150° and the underwater superoleophobicity is still maintained, after the photocatalytic stainless steel wire mesh obtained in the first embodiment of the present disclosure separates salty oily wastewater with salt contents of 0, 2, 4, 6, 8, 10 wt %. In addition, the separation efficiency of the salty oily wastewater is above 99%, which indicates that an influence of the salt content on the performance of the oil-water separation material is small, and the material has good salt resistance.

Figure 6:
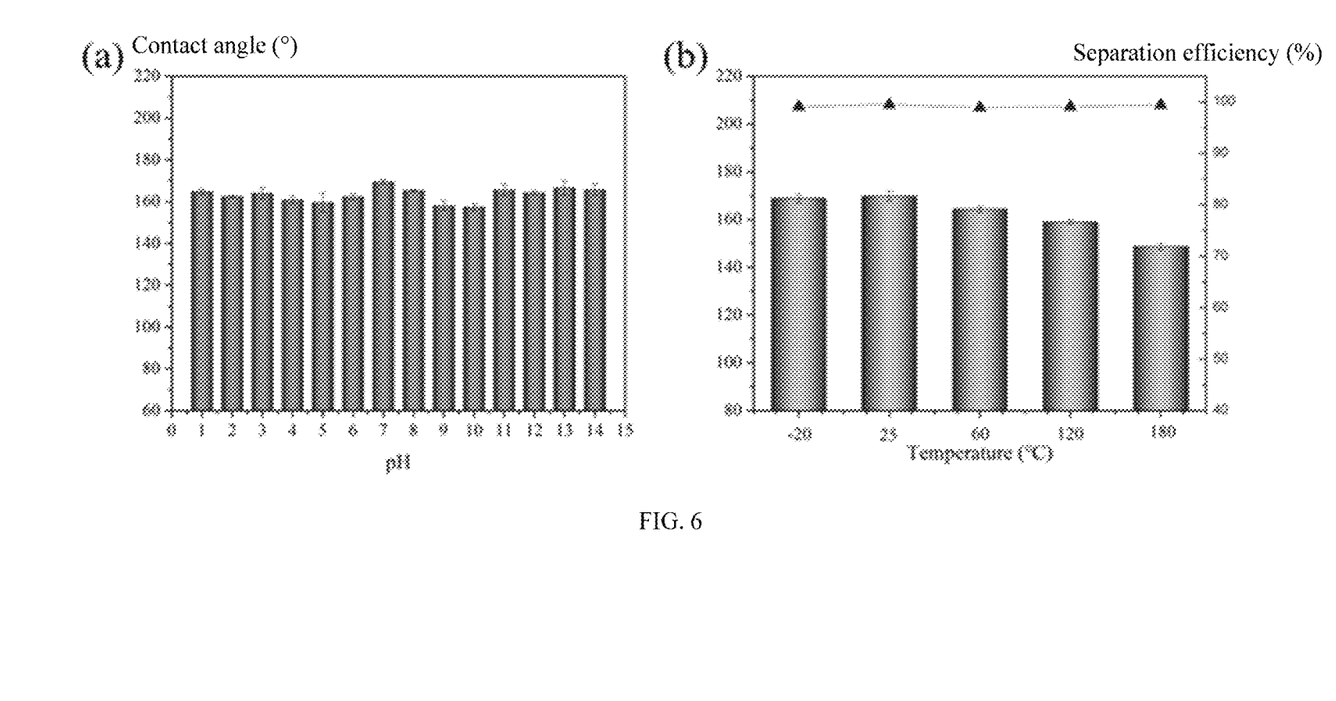
FIG. 6 is a diagram showing the separation effect of the oil-water separation material on the oil-water mixture (a) with different pH values, and the oil-water separation material (b) treated at different temperatures in accordance with the first embodiment of the present disclosure.
Figure 7:
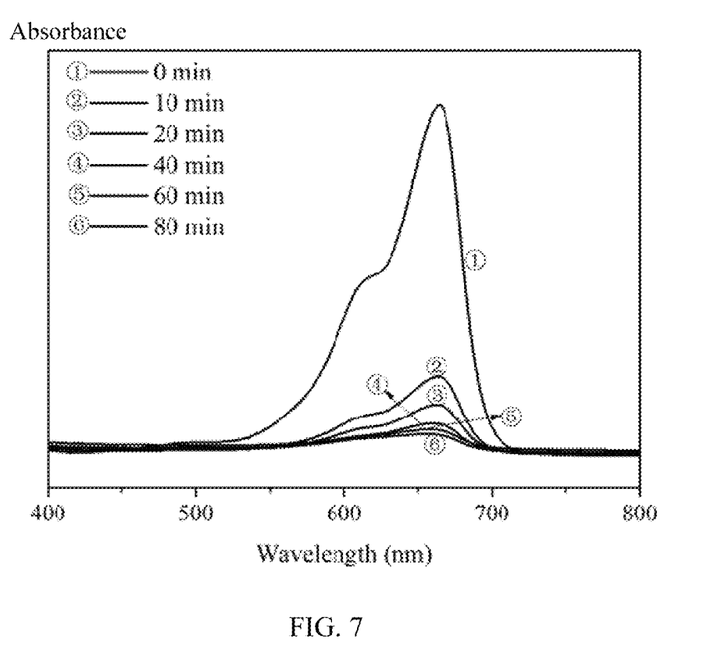
FIG. 7 is a diagram showing an absorbance curve of performing photocatalytic degradation on an organic dye such as methylene blue by the oil-water separation material in accordance with the first embodiment of the present disclosure.
Figure 8:
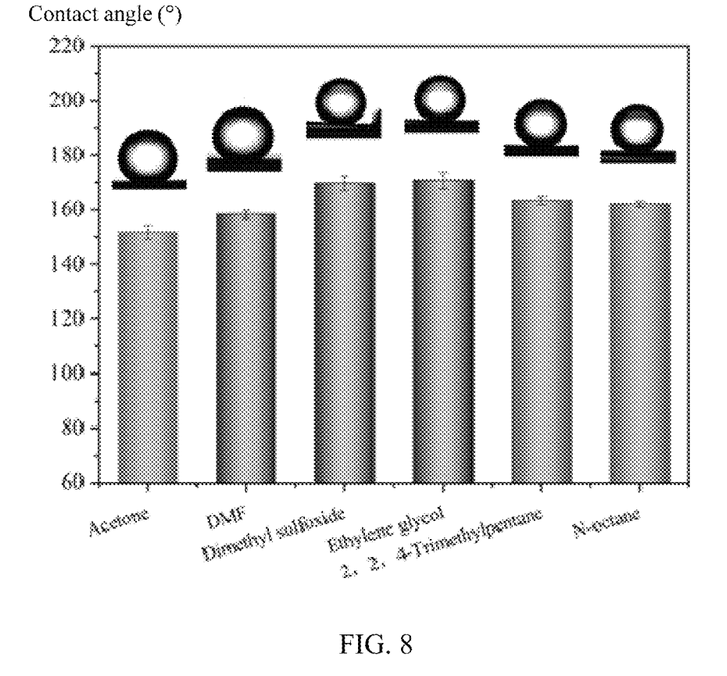
FIG. 8 is a diagram showing the underwater oil contact angle of the oil-water separation material after being soaked in different organic solvents for 48 hours in accordance with the first embodiment of the present disclosure.
Figure 9:
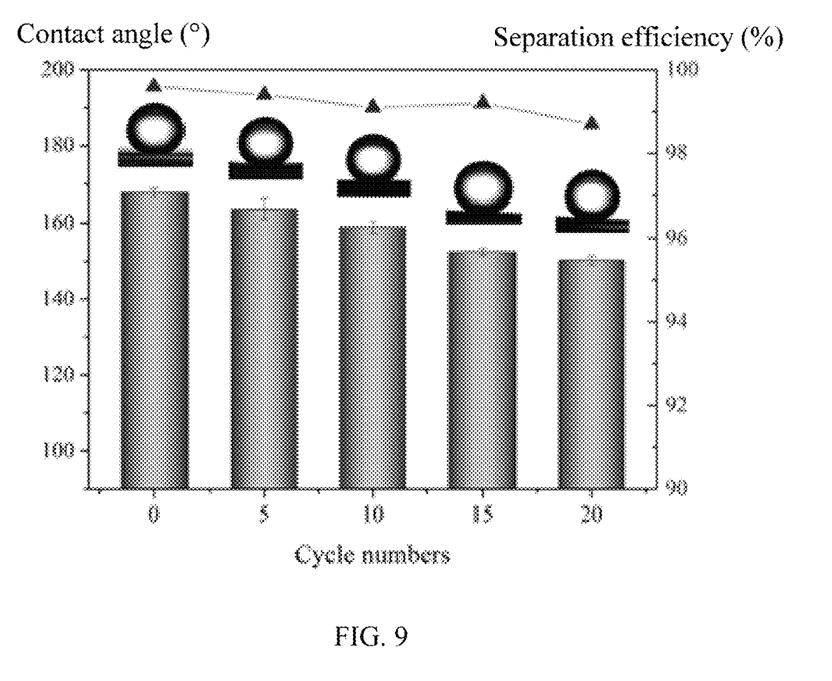
FIG. 9 is a diagram showing the underwater oil contact angle and the oil-water separation effect obtained after the oil-water separation material is reused for 20 times in accordance with the first embodiment of the present disclosure.

6. Acid-alkali resistance and high/low temperature resistance test: FIG. 6 is a diagram showing acid-alkali stability and high-low temperature stability tests of the oil-water separation material obtained in the first embodiment of the present disclosure, it can be seen from FIG. (a) of FIG. 6 that after the oil-water separation material is soaked for 48 hours under acidic and alkaline conditions, the underwater oil contact angle can still be maintained above 150°, and the super hydrophilicity and underwater superoleophobic performance are not affected by strong acid and strong alkali. It can be seen from FIG. (b) of FIG. 6 that, after the oil-water separation material is respectively placed at −20° C., 25° C., 60° C. , 120° C. and 180° C. for 6 hours, the superhydrophilicity/underwater superoleophobic performance of the oil-water separation material is slightly influenced by low temperatures. After performing high temperature treatment, although the underwater superoleophobic performance is reduced, the contact angle is still greater than 150°, so that the oil-water separation material still has the underwater superoleophobic performance. In addition, it can be seen from the oil-water separation effect that the separation efficiency of the oil-water separation material treated at different temperatures for the cyclohexane/water mixture is more than 99%.

7. Photocatalytic degradation test of organic dyes: FIG. 4 is a diagram of an absorbance curve of photocatalytic degradation of the methylene blue by the photocatalytic stainless steel wire mesh obtained in the first embodiment of the present disclosure, it can be seen that a degradation rate of the methylene blue can reach 80% after the stainless steel wire mesh with photocatalytic performance is soaked in the methylene blue solution and reacted under light for 10 minutes. After being reacted for 80 minutes, the degradation rate of the methylene blue can reach 99%. Due to the doping effect of copper, the MOFs form a bimetal center structure, so that the forbidden bandwidth of the MOFs can be reduced, and the photocatalytic degradation performance can be improved.

Figure 5:
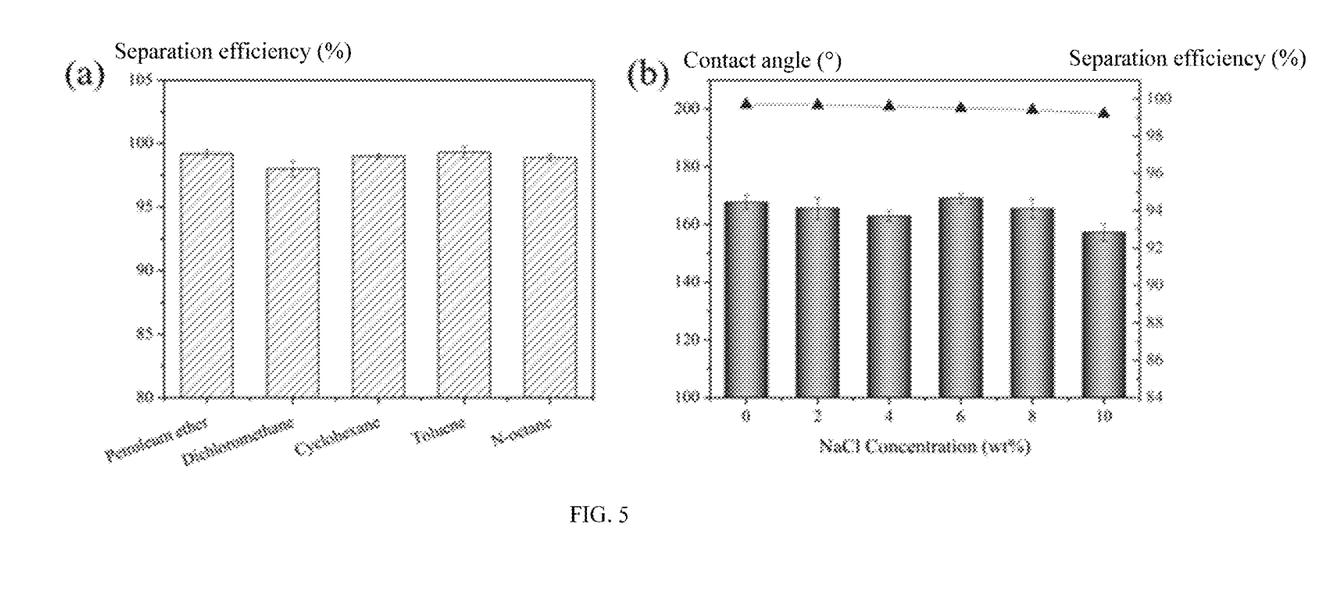
FIG. 5 is a diagram showing a separation effect of the oil-water separation material on different light oil and heavy oil (a), and an oil-water mixture (b) with different salt contents in accordance with the first embodiment of the present disclosure.

8. Chemical stability test: FIG. 5 is a diagram showing the underwater oil contact angle of the stainless steel wire mesh that has been modified after being soaked in different organic solvents for 48 hours, the stainless steel wire mesh obtained in the embodiment is soaked in different organic solvents (acetone, DMF, dimethyl sulfoxide, ethylene glycol, isooctane and n-octane). It can be seen that the contact angles are all greater than 150° and can reach 165° at most, after being soaked in different organic solvents for 48 hours, and the underwater superoleophobicity can be still maintained, which indicates that the stainless steel wire mesh that has been modified has performance of resistance to organic solvents and good chemical stability.

9. Recyclable test: FIG. 6 is a diagram showing the underwater oil contact angle and the oil-water separation effect of the stainless steel wire mesh that has been modified after being reused for 20 times. After the oil-water separation experiment is repeated for 20 times, the underwater oil contact angle of the stainless steel wire mesh obtained in the first embodiment of the present disclosure is reduced, but the underwater oil contact angle can still be maintained at 150-170°, which indicates that the underwater superoleophobicity of the material is less influenced in the recyclable process. In addition, the separation effect of the cyclohexane/water mixture decreases after being reused for 10 times, at this time, the oil-water separation effect is 99.0-99.5%; the oil-water separation effect is 98.0-99.0% after being reused for 20 times, which indicates that the stainless steel wire mesh that has been modified has good recyclable performance.

It should be understood by one of ordinary skilled in the related art that the above embodiments are only a description of the present disclosure and the foregoing description is not in any form a limitation to the present disclosure. Any variation or replacement made by one of ordinary skilled in the related art without departing from the spirit of the present disclosure shall fall within the protection scope of the present disclosure.

What is claimed is:

1. A preparation method of a photocatalytic oil-water separation material comprising the following steps:
    step S1, sequentially cleaning a base material and a metal-doped material by using an alcohol solvent, a dilute acid solution and deionized water, and drying for later use;
    step S2, preparing a mixed solution of an amine monomer and an acid-alkali buffer reagent, soaking the base material in the mixed solution, and reacting under an oscillation condition, to obtain the base material attached with amine monomer polymer;
    step S3, dissolving a soluble metal additive and an organic ligand reagent comprising carboxylic acid or pyridine into an organic solvent, and uniformly performing ultrasonic stirring, to obtain a photocatalytic Metal-Organic Frameworks (MOFs) reaction solution;
    step S4, placing the metal-doped material in the step S1, the base material that has been reacted in the step S2 and the MOFs reaction solution obtained in the step S3 into a reaction kettle for performing hydrothermal reaction; and
    step S5, cleaning excess impurities on surfaces of the base material that has been reacted in the step S4 by using anhydrous methanol or anhydrous ethanol and then drying, to obtain the photocatalytic oil-water separation material; and wherein
    a metal element comprised in the soluble metal additive is different from that of the metal-doped material, and a main metal component comprised in the base material is different from the metal element of the metal-doped material
    wherein the base material in the step S1 is a stainless steel wire mesh; the metal-doped material is a copper mesh; the soluble metal additive in the step S3 is zirconium chloride.

2. The preparation method as claimed in claim 1, wherein the alcoholic solvent in the step S1 is the anhydrous methanol, with a mass fraction of 95%-99.9%; the diluted acid solution is diluted hydrochloric acid, with a concentration of 0.25-1.0 M.

3. The preparation method as claimed in claim 1, wherein the amine monomer in the step S2 is dopamine hydrochloride, with a concentration of 0.5-2.5 mg/mL; the acid-alkali buffer reagent is a tris (hydroxymethyl) aminomethane hydrochloride reagent, with a concentration of 0.05-0.2 mg/L; and a pH value of the mixed solution is 8-9.

4. The preparation method as claimed in claim 3, wherein a specific operation of the step S2 is as follows: preparing an amine monomer solution, and then adjusting a pH value of the amine monomer solution to 8.5 by using a buffer solution and a sodium hydroxide solution, adding the base material obtained in the step S1 within 10 seconds, and reacting for 12-24 hours at a constant temperature under conditions that a temperature is 20-80° C. and a stirring speed is 60-180 r/min, to obtain the base material attached with amine monomer polymer.

5. The preparation method as claimed in claim 1, wherein in the step S3, a concentration of the soluble metal additive in the MOFs reaction solution is 10-30 mM; the organic ligand reagent comprising the carboxylic acid or the pyridine is 2-aminoterephthalic acid, with a concentration of 10-30 mM; the organic solvent is N, N-dimethylformamide.

6. The preparation method as claimed in claim 1, wherein in the step S4, a quantity ratio of the base material to the metal-doped material is 2:1-10:1, both the base material and the metal-doped material soaked in the MOFs reaction solution; a time of the hydrothermal reaction is 6-24 hours, and a reaction temperature of the hydrothermal reaction is 100-180° C.

* * * * *